United States Patent
Hwang et al.

(10) Patent No.: US 12,237,490 B2
(45) Date of Patent: Feb. 25, 2025

(54) METHOD AND APPARATUS FOR PRE-LITHIATION OF ELECTRODE

(71) Applicant: LG Energy Solution, Ltd., Seoul (KR)

(72) Inventors: Seung-Hae Hwang, Daejeon (KR); Ye-Ri Kim, Daejeon (KR); Oh-Byong Chae, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 888 days.

(21) Appl. No.: 17/425,203

(22) PCT Filed: Sep. 3, 2020

(86) PCT No.: PCT/KR2020/011887
§ 371 (c)(1),
(2) Date: Jul. 22, 2021

(87) PCT Pub. No.: WO2021/045542
PCT Pub. Date: Mar. 11, 2021

(65) Prior Publication Data
US 2022/0115632 A1 Apr. 14, 2022

(30) Foreign Application Priority Data
Sep. 6, 2019 (KR) .......... 10-2019-0110756

(51) Int. Cl.
*H01M 4/04* (2006.01)
*H01M 4/02* (2006.01)
(Continued)

(52) U.S. Cl.
CPC ....... *H01M 4/0404* (2013.01); *H01M 4/0435* (2013.01); *H01M 4/13* (2013.01);
(Continued)

(58) Field of Classification Search
CPC ............. H01M 4/0404; H01M 4/0435; H01M 4/382; H01M 2004/027
See application file for complete search history.

(56) References Cited

U.S. PATENT DOCUMENTS 5,595,837 A * 1/1997 Olsen ...................... H01M 4/13
 205/59
5,743,921 A  4/1998 Nazri et al.
(Continued)

FOREIGN PATENT DOCUMENTS

CN  104081573 B  1/2018
CN  111162246 A * 5/2020
(Continued)

OTHER PUBLICATIONS

Extended European Search Report for European Application No. 20861604.5, dated Apr. 20, 2022.
(Continued)

*Primary Examiner* — Ciel P Contreras
*Assistant Examiner* — Kevin Sylvester
(74) *Attorney, Agent, or Firm* — Birch, Stewart, Kolasch & Birch, LLP

(57) ABSTRACT

A method for pre-lithiation of an electrode, including a first step of providing a pre-lithiation reaction system which includes a first reaction system including lithium metal, a separator, an electrolyte for pre-lithiation and carbon felt, and a second reaction system including the electrolyte for pre-lithiation and an electrode to be pre-lithiated, wherein the lithium metal and the electrode to be pre-lithiated are not in direct contact with each other. The first reaction system and the second reaction system communicate with each other. The first step is followed by a second step of preparing an electrode including an electrode current collector, and an electrode active material layer formed on at least one surface of the electrode current collector; and a third step of allow-
(Continued)

ing the electrode to pass through the second reaction system by a conveying roll to carry out pre-lithiation of the electrode.

10 Claims, 3 Drawing Sheets

(51) Int. Cl.
    *H01M 4/13*       (2010.01)
    *H01M 4/139*     (2010.01)
    *H01M 4/38*       (2006.01)
    *H01M 10/052*    (2010.01)

(52) U.S. Cl.
    CPC ........... *H01M 4/139* (2013.01); *H01M 4/382* (2013.01); *H01M 2004/027* (2013.01); *H01M 10/052* (2013.01)

(56) References Cited

U.S. PATENT DOCUMENTS

| | | |
|---|---|---|
| 2008/0073217 A1 | 3/2008 | Takezawa |
| 2013/0327648 A1 | 12/2013 | Grant et al. |
| 2015/0263379 A1* | 9/2015 | Xiao .................. H01M 10/052 205/59 |
| 2016/0006017 A1 | 1/2016 | Momma et al. |
| 2018/0198118 A1 | 7/2018 | Amiruddin et al. |
| 2020/0058929 A1 | 2/2020 | Chae et al. |

FOREIGN PATENT DOCUMENTS

| | | | |
|---|---|---|---|
| JP | 9-22690 A | 1/1997 | |
| JP | 2008-91191 A | 4/2008 | |
| JP | 2016-27562 A | 2/2016 | |
| JP | 2017-11068 A | 1/2017 | |
| JP | 2017-507472 A | 3/2017 | |
| KR | 10-2014-0070156 A | 6/2014 | |
| KR | 10-2015-0014877 A | 2/2015 | |
| KR | 10-2017-0059036 A | 5/2017 | |
| KR | 10-2019-0017149 A | 2/2019 | |
| WO | WO-2017086546 A1 * | 5/2017 | ........ H01M 10/0568 |
| WO | WO 2019/009177 A1 | 1/2019 | |

OTHER PUBLICATIONS

International Search Report for PCT/KR2020/011887 mailed on Dec. 17, 2020.

* cited by examiner

METHOD AND APPARATUS FOR PRE-LITHIATION OF ELECTRODE

TECHNICAL FIELD

The present disclosure relates to a method and apparatus for pre-lithiation of an electrode.

The present application claims priority to Korean Patent Application No. 10-2019-0110756 filed on Sep. 6, 2019 in the Republic of Korea, the disclosures of which are incorporated herein by reference.

BACKGROUND ART

As technological development and demand for various instruments have been increased, rechargeable secondary batteries have been increasingly in demand as energy sources. Among such secondary batteries, lithium secondary batteries having high energy density and voltage, long cycle life and a low discharge rate have been commercialized and used widely.

Such a lithium secondary battery generally uses, as a positive electrode active material, lithium-containing cobalt oxide ($LiCoO_2$) having a layered crystal structure, lithium-containing manganese oxide, such as $LiMnO_2$ having a layered crystal structure, $LiMn_2O_4$ having a spinel crystal structure, or the like, and lithium-containing nickel oxide ($LiNiO_2$). In addition, a carbonaceous material is used frequently as a negative electrode active material. Recently, a high-capacity secondary battery has been increasingly in demand, and thus combined use with a silicon-based material or silicon oxide-based material having effective capacity at least 10 times higher than the capacity of a carbonaceous material has been considered.

However, a lithium secondary battery has various problems, a part of which are related with the manufacture and operation characteristics of a negative electrode.

For example, a carbonaceous negative electrode active material forms a solid electrolyte interphase (SEI) layer on the surface of the negative electrode active material during the initial charge/discharge process (activation process). Due to this, there are problems in that initial irreversibility occurs, the SEI layer may be destroyed during the continuous charge/discharge processes and an electrolyte is depleted during the regeneration process to cause degradation of battery capacity.

To solve the above-mentioned problems, active studies have been conducted about methods for pre-lithiation of a negative electrode.

One of such methods is allowing lithium metal foil to be in direct contact with a negative electrode to carry out pre-lithiation. FIG. 1 is a schematic view illustrating the method. Referring to FIG. 1, a negative electrode active material layer 20 formed on one surface of a current collector 10 is in direct contact with lithium metal foil 30 to carry out pre-lithiation. However, the method causes non-homogeneous pre-lithiation (or lithium doping) depending on the distance between the negative electrode active material region, where pre-lithiation occurs, and the counter electrode. In addition, since electron transport is carried out actively in the vicinity of an electrode tab, but is performed relatively less actively, as the distance from the electrode tab is increased, there is a problem in that non-homogeneous pre-lithiation occurs depending on the interval from the electrode tab.

DISCLOSURE

Technical Problem

The present disclosure is designed to solve the problems of the related art.

The present inventors have conducted intensive studies and various tests, and the present disclosure is directed to providing a pre-lithiation method which is sustainable on the whole of a negative electrode and allows homogeneous pre-lithiation, and an apparatus therefor.

The present disclosure is also directed to providing a pre-lithiation method which can be carried out continuously to a process for manufacturing a negative electrode, and an apparatus therefor.

Technical Solution

In one aspect of the present disclosure, there is provided a method for pre-lithiation of an electrode according to any one of the following embodiments. According to the first embodiment of the present disclosure, there is provided a method for pre-lithiation of an electrode, including the steps of: (S1) providing a pre-lithiation reaction system which includes a first reaction system including lithium metal, a separator, an electrolyte for pre-lithiation and carbon felt, and a second reaction system including the electrolyte for pre-lithiation and an electrode to be pre-lithiated, wherein the lithium metal and the electrode to be pre-lithiated are not in direct contact with each other, and the first reaction system and the second reaction system communicate with each other; (S2) preparing an electrode including an electrode current collector, and an electrode active material layer formed on at least one surface of the electrode current collector; and (S3) allowing the electrode to pass through the second reaction system by a conveying roll to carry out pre-lithiation of the electrode, wherein the electrolyte for pre-lithiation includes at least one of an organic material or an inorganic material capable of oxidation/reduction in the electrolyte.

According to the second embodiment of the present disclosure, there is provided the method for pre-lithiation of an electrode as defined in the first embodiment, wherein the electrolyte for pre-lithiation includes an organic material, inorganic material or a mixture thereof having a reaction potential of 0.001V to 3V based on $Li/Li^{3O}$.

According to the third embodiment of the present disclosure, there is provided the method for pre-lithiation of an electrode as defined in the first or the second embodiment, wherein the electrolyte for pre-lithiation includes at least one of a phthalimide compound as the organic material or a metallocene compound as the inorganic compound capable of oxidation/reduction in the electrolyte.

According to the fourth embodiment of the present disclosure, there is provided the method for pre-lithiation of an electrode as defined in any one of the first to the third embodiments, wherein the electrolyte for pre-lithiation includes at least one of N-butyl phthalimide, N-methyl phthalimide, cobaltocene, bis (pentamethylcyclopentadienyl) cobalt er a mixture thereof, as an organic material or inorganic material capable of oxidation/reduction in the electrolyte.

According to the fifth embodiment of the present disclosure, there is provided the method for pre-lithiation of an electrode as defined in any one of the first to the fourth embodiments, wherein the electrolyte for pre-lithiation includes at least one of the organic material or inorganic material capable of oxidation/reduction in the electrolyte at a concentration of 0.0001M to 10M.

According to the sixth embodiment of the present disclosure, there is provided the method for pre-lithiation of an electrode as defined in any one of the first to the fifth embodiments, wherein an electric current ranging from 0.001 mA/cm$^2$ to 1000 mA/cm$^2$ is supplied to the carbon felt.

According to the seventh embodiment of the present disclosure, there is provided the method for pre-lithiation of an electrode as defined in any one of the first to the sixth embodiments, wherein the electrode is in contact with the electrolyte for pre-lithiation of the second reaction system for 10 minutes to 180 minutes.

According to the eighth embodiment of the present disclosure, there is provided the method for pre-lithiation of an electrode as defined in any one of the first to the seventh embodiments, wherein the electrode is a negative electrode.

In another aspect of the present disclosure, there is also provided an apparatus for pre-lithiation according to any one of the following embodiments. According to the ninth embodiment of the present disclosure, there is provided an apparatus for pre-lithiation which includes a first reaction system including lithium metal, a separator stacked on the lithium metal, an electrolyte for pre-lithiation and carbon felt, and a second reaction system including the electrolyte for pre-lithiation and an electrode to be pre-lithiated, wherein the electrolyte for pre-lithiation comprises at least one of an organic material or inorganic material capable of oxidation/reduction in the electrolyte, wherein the first reaction system and second reaction system communicate with each other through a line configured to convey the electrolyte for pre-lithiation, the carbon felt is linked to an electricity supplying source, and the electrode to be pre-lithiated is passes through the second reaction system by a conveying roll.

According to the tenth embodiment of the present disclosure, there is provided an apparatus for pre-lithiation which includes a first reaction system including lithium metal, a separator stacked on the lithium metal, an electrolyte for pre-lithiation and carbon felt, and a second reaction system including the electrolyte for pre- lithiation and an electrode to be pre-lithiated, wherein the electrolyte for pre-lithiation comprises at least one of an organic material or inorganic material capable of oxidation/reduction in the electrolyte, wherein the first reaction system and second reaction system are received in the same reaction vessel, the carbon felt is disposed between the first reaction system and second reaction system, the carbon felt is linked to an electricity supplying source, and the electrode to be pre-lithiated is passes through the second reaction system by a conveying roll.

Advantageous Effects

The pre-lithiation reaction system according to the present disclosure includes Reaction System 1 including lithium metal, a separator and an electrolyte for pre-lithiation controlled to have a predetermined electric potential, and Reaction System 2 including the electrolyte for pre-lithiation and an electrode to be pre-lithiated, and thus the electrode to be pre-lithiated is not in direct contact with lithium metal. Therefore, it is possible to prevent the problems generated by a direct contact between lithium metal and the electrode to be pre-lithiated, such as the problem of non-homogeneous pre-lithiation caused by a difference in distance between lithium metal and the electrode to be pre-lithiated.

According to the present disclosure, since lithium metal forms the counter electrode of the electrolyte for pre-lithiation, lithium metal may compensate for consumed lithium salt, when lithium salt (electrons, practically) is consumed for charging the electrolyte for pre-lithiation.

According to the present disclosure, since the electrolyte for pre-lithiation having high flowability is used as a direct source for pre-lithiation in Reaction System 2, it is possible to carry out homogeneous pre-lithiation of an electrode. In addition, since the electrolyte having high flowability is used as a direct source for pre-lithiation in Reaction System 2, it is not required to consider a degree of compressing lithium metal foil, unlike the conventional pre-lithiation method carried out by direct compression of lithium metal foil against an electrode.

According to the present disclosure, since the electrolyte having high flowability is used as a direct source for pre-lithiation in Reaction System 2, it is less likely that a side reaction of lithium plating occurs due to pre-lithiation in a partially over-charged state at the electrode region near the electrode tab. Therefore, a lithium secondary battery using the electrode pre-lithiated according to the present disclosure shows excellent safety and cycle characteristics. For reference, when lithium plating occurs, a lithium secondary battery requires a significantly high electric current for charging and lithium cations are deposited in the form of metallic lithium to cause an internal short-circuit of the battery, resulting in degradation of the life and durability of the battery.

According to the present disclosure, the electrolyte for pre-lithiation is charged at the carbon felt electrode, and the charged electrolyte is in contact with the electrode to be pre-lithiated and then is returned to its original state (i.e. discharged), while providing electrons to the electrode. Therefore, the electrolyte for pre-lithiated is not consumed but is recovered to its original state, despite the pre-lithiation, and thus can be used continuously. As a result, even after carrying out pre-lithiation, it is not required to regenerate the electrolyte for pre-lithiation or to introduce a specific ingredient of the electrolyte for pre-lithiation additionally. In this manner, it is possible to 'reuse' the electrolyte for pre-lithiation 'continuously'.

According to the present disclosure, pre-lithiation may be carried out through a continuous process by simply adding a batch for pre-lithiation to a conventional manufacture processing line. In other words, there is no need for a separate manufacture processing line for pre-lithiation. When a pre-lithiation process is carried out in a separate manufacture processing line, the electrode sheet is wound and dewound for its storage before and after the pre-lithiation process. However, such winding and dewinding may cause damage upon the electrode sheet. According to the present disclosure, since there is no need for a separate manufacture processing line for pre-lithiation, it is possible to minimize the cost required for processing equipment and to significantly reduce a possibility of damage upon the electrode sheet, which, otherwise, is generated in the conventional pre-lithiation processes. For reference, 'roll' or 'conveying roll' used herein refers to a kind of conveying device used for conveying an electrode, or the like, and amenable to winding and dewinding.

BEST MODE

Figure 1:
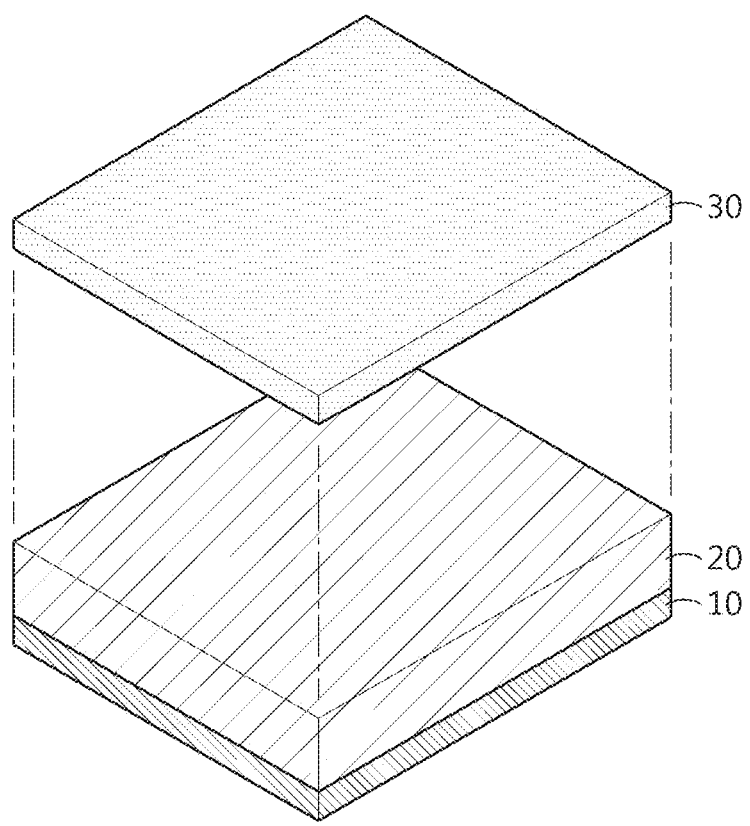
FIG. 1 is a schematic view illustrating an embodiment of the method for carrying out pre-lithiation by using lithium metal foil according to the related art.
Figure 2:
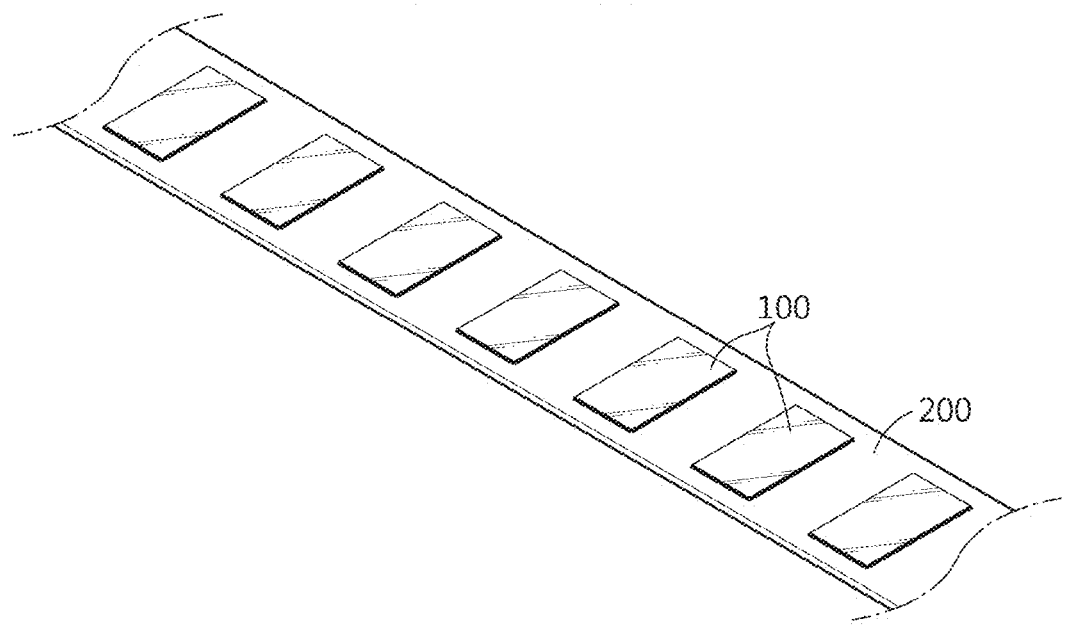
FIG. 2 is a schematic view illustrating an embodiment of conveying a plurality of negative electrode sheets subjected to a pressing process along a processing line according to the related art.

Hereinafter, preferred embodiments of the present disclosure will be described in detail with reference to the accompanying drawings.

In one aspect of the present disclosure, there is provided a method for pre-lithiation of an electrode, including the steps of:

(S1) providing a pre-lithiation reaction system which includes Reaction System 1 including lithium metal, a separator, an electrolyte for pre-lithiation and carbon felt, and Reaction System 2 including the electrolyte for pre-lithiation and an electrode to be pre-lithiated, wherein the lithium metal and the electrode to be pre-lithiated are not in direct contact with each other, and Reaction System 1 and Reaction System 2 communicate with each other;

(S2) preparing an electrode including an electrode current collector, and an electrode active material layer formed on at least one surface of the electrode current collector; and (S3) allowing the electrode to pass through Reaction System 2 by a conveying roll to carry out pre-lithiation of the electrode, wherein the electrolyte for pre-lithiation includes an organic material, inorganic material or a mixture thereof capable of oxidation/reduction in the electrolyte.

According to an embodiment of the present disclosure, the order of step (S1) and that of step (S2) may be exchanged, or step (S1) and step (S2) may be carried out at the same time.

Hereinafter, the method for pre-lithiation of an electrode will be explained in more detail.

First, provided is a pre-lithiation reaction system which includes Reaction System 1 including lithium metal, a separator, an electrolyte for pre-lithiation and carbon felt, and Reaction System 2 including the electrolyte for pre-lithiation and an electrode to be pre-lithiated, wherein Reaction System 1 and Reaction System 2 communicate with each other (step (S1)).

According to an embodiment of the present disclosure, lithium metal may be one used conventionally in the art and may include a pressurized lithium metal plate, non-pressurized lithium metal plate, lithium metal powder or a mixture thereof, but is not limited thereto.

According to the present disclosure, the separator is stacked on lithium metal and prevents the electrolyte for pre-lithiation and lithium metal from being in direct with each other to cause a short-circuit.

According to an embodiment of the present disclosure, the separator may be one used conventionally in the art. According to an embodiment of the present disclosure, a thin film-type insulating separator having high ion permeability and mechanical strength may be used. The separator may be provided with pores having an average diameter of 0.01-10 μm and may have a thickness of 5-300 μm. Particular examples of the separator include sheets or non-woven webs made of an olefinic polymer, such as polypropylene, having chemical resistance and hydrophobicity; glass fibers or polyethylene, or the like.

According to the present disclosure, the electrolyte for pre-lithiation is prepared in such a manner that it may have a difference in electric potential from lithium metal. More particularly, the electrolyte for pre-lithiation includes an organic material or inorganic material capable of oxidation/reduction, and the organic material or inorganic material participates in an electrochemical or chemical oxidation/reduction mechanism and shows a thermodynamically spontaneous electron transporting effect derived from a difference in energy level from the electrode to be pre-lithiated.

According to an embodiment of the present disclosure, the electrolyte for pre-lithiation includes an organic material, inorganic material or a mixture thereof having a reaction potential of 0.001-3V based on Li/Li$^+$. As used herein, 'reaction potential' refers to an electric potential where electrochemical oxidation or reduction occurs and means a value measured by a potentiometer on the basis of the lithium reaction potential (Li/Li$^+$). When the reaction potential of the organic material or inorganic material capable of oxidation/reduction is lower than the lower limit, lithium plating occurs. On the other hand, when the reaction potential is higher than the upper limit, it does not fall within the reaction range of the electrode to be pre-lithiated.

According to an embodiment of the present disclosure, non-limiting examples of the organic material or inorganic material capable of oxidation/reduction include a phthalimide compound, metallocene compound or a mixture thereof. For example, N-butyl phthalimide (reaction potential: 1.52V (vs. Li/Li$^+$), N-methyl phthalimide (reaction potential: 1.62V (vs. Li/Li$^+$), cobaltocene (reaction potential: 1.90V (vs. Li/Li$^+$)), bis(pentamethylcyclopentadienyl)cobalt (reaction potential: 1.36V (vs. Li/Li$^+$), or a mixture thereof may be used.

According to an embodiment of the present disclosure, the organic material or inorganic material capable of oxidation/reduction may be used in the electrolyte for pre-lithiation at a concentration of 0.0001-10M, 0.01-10M, 0.01-1M, 0.1-1M, or 1-10M. When the organic material or inorganic material capable of oxidation/reduction is used in the electrolyte for pre-lithiation at the above-defined concentration, the electrolyte for pre-lithiation can be charged by a difference in electric potential from lithium metal as a counter electrode.

According to an embodiment of the present disclosure, the electrolyte for pre-lithiation may include a lithium salt and an organic solvent, in addition to the organic material or inorganic material capable of oxidation/reduction.

According to an embodiment of the present disclosure, non-limiting examples of the lithium salt include LiCl, LiBr, LiI, LiClO$_4$, LiBF$_4$, LiB$_{10}$Cl$_{10}$, LiPF$_6$, LiFSI, LITFSI, LiCF$_3$SO$_3$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lithium lower aliphatic carboxylate, lithium 4-phenylborate, or a mixture thereof.

According to an embodiment of the present disclosure, non-limiting examples of the organic solvent include carbonate solvents and/or ester solvents. Particularly, non-limiting examples of the organic solvent include ethylene carbonate, propylene carbonate, butylene carbonate, γ-butyrolactone, γ-valerolactone, γ-caprolactone, σ-valerolactone, ε-caprolactone, dimethyl carbonate, ethyl methyl carbonate, diethyl carbonate, dipropyl carbonate, dibutyl carbonate, methyl acetate, ethyl acetate, methyl hexanoate, methyl formate, a derivative thereof, or a mixture thereof.

According to an embodiment of the present disclosure, the electrolyte for pre-lithiation may further include an additive. Non-limiting examples of the additive include vinylene carbonate, vinyl ethylene carbonate, fluoroethyl carbonate, salicylic acid, or a mixture thereof.

According to an embodiment of the present disclosure, the lithium salt may be used in the electrolyte for pre-lithiation at a concentration of 0.1-10M, or 0.1-5M. When the lithium salt is contained in the electrolyte for pre-lithiation at the above-defined concentration range, there is provided an effect of providing low resistance, when electric current is applied to the carbon felt.

According to an embodiment of the present disclosure, the electrolyte for pre-lithiation is maintained at a temperature of 10-20° C., or 20-40° C. When the electrolyte for pre-lithiation is maintained within the above-defined temperature range, it is possible to inhibit generation of high-temperature decomposition products and to prevent an increase in resistance (polarization) at low temperature.

According to an embodiment of the present disclosure, the electrolyte for pre-lithiation is maintained at a pH of 5-9, 5-7, or 7-9. When the electrolyte for pre-lithiation is maintained within the above-defined pH range, it is possible to carry out pre-lithiation, while preventing damage upon the electrode to be pre-lithiated.

According to an embodiment of the present disclosure, the electrolyte for pre-lithiation has an ion conductivity of 5-10 mS/cm, 10-30 mS/cm, 10-20 mS/cm, or 20-30 mS/cm. When the electrolyte for pre-lithiation has the above-defined range of ion conductivity, it is possible to reduce resistance (polarization) generated upon the charging of the electrolyte for pre-lithiation.

The carbon felt electrode functions as a site where the electrolyte for pre-lithiation performs a reaction of accepting or donating electrons, when electric current is applied with lithium metal functioning as a counter electrode so that electrolyte for pre-lithiation may be charged.

According to an embodiment of the present disclosure, the carbon felt electrode may have a specific surface area of 10-100 $cm^{-1}$, 10-200 $cm^{-1}$, or 10-400 $cm^{-1}$. When the carbon felt electrode has the above-defined range of specific surface area, it is possible to provide an increased contact surface with the electrolyte for pre-lithiation.

According to an embodiment of the present disclosure, the carbon felt electrode may have a density of 0.001-10 $g/cm^3$, 0.01-1 $g/cm^3$, or 0.01-0.1 $g/cm^3$. Otherwise, the carbon felt electrode may have a planar shape and a difference in density of 0.01-10 $g/cm^3$, or 1-10 $g/cm^3$ from the electrolyte for pre-lithiation. When the carbon felt electrode has a planar shape and the above-defined range of density, it can be disposed at a suitable position in the reaction system and can function as a reaction site of the electrolyte for pre-lithiation.

According to an embodiment of the present disclosure, the carbon felt electrode may have a planar shape. In this case, the carbon felt electrode may have an area covering 10-50%, 20-50%, 20-30%, or 30-50% of the surface of the electrolyte for pre-lithiation. When the carbon felt electrode has a planar shape and the above-defined range of area, it is possible to reduce side reactions of the electrolyte and to charge most part of the organic material or inorganic material in the electrolyte for pre-lithiation.

According to an embodiment of the present disclosure, the carbon felt electrode may be provided in a planar shape having a thickness of 0.1-10 mm, 0.1-1 mm, 1-5 mm, or 5-10 mm. When the carbon felt electrode has a planar shape and the above-defined range of thickness, it is possible to provide an increased contact surface with the electrolyte for pre-lithiation.

According to an embodiment of the present disclosure, the carbon felt electrode may have various shapes, such as a pillar shape, including a trigonal prism, square pillar or a cylinder, in addition to a planar shape. In this case, it is preferred that the carbon felt electrode is dipped in the electrolyte for pre-lithiation at a ratio of 40-60 vol %, 60-80 vol %, or 80-100 vol % to provide an increased contact surface and to reduce resistance applied to the electrode.

Separately from the provision of the reaction system, prepared is an electrode including an electrode current collector, and an electrode active material layer formed on at least one surface of the electrode current collector (step (S2)).

According to an embodiment of the present disclosure, the electrode current collector generally has a thickness of 3-500 μm.

According to an embodiment of the present disclosure, when the electrode is a negative electrode, the negative electrode current collector is not particularly limited, as long as it has conductivity, while not causing any chemical change in the corresponding battery. Particular examples of the negative electrode current collector include copper, stainless steel, aluminum, nickel, titanium, baked carbon, copper or stainless steel surface-treated with carbon, nickel, titanium, silver, etc., aluminum-cadmium alloy, or the like. In addition, fine surface irregularities may be formed on the surface of the electrode current collector to reinforce the binding force to the negative electrode active material. The negative electrode current collector may be used in various shapes, including a film, sheet, foil, net, porous body, foamed body, non-woven web, or the like.

According to an embodiment of the present disclosure, when the electrode is a positive electrode, the positive electrode current collector generally has a thickness of 3-500 μm. The positive electrode current collector is not particularly limited, as long as it has high conductivity, while not causing any chemical change in the corresponding battery. Particular examples of the positive electrode current collector include stainless steel, aluminum, nickel, titanium, baked carbon, or aluminum or stainless steel surface-treated with carbon, nickel, titanium, silver, etc., or the like. In addition, fine surface irregularities may be formed on the surface of the electrode current collector to reinforce the binding force to the positive electrode active material. The positive electrode current collector may be used in various shapes, including a film, sheet, foil, net, porous body, foamed body, non-woven web, or the like.

According to an embodiment of the present disclosure, when the electrode is a negative electrode, the negative electrode active material may include titanium oxide, a carbonaceous material, a metal composite oxide, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, an element of Group 1, Group 2 or Group 3 in the Periodic Table, or halogen; $0<x\leq1$; $1\leq y\leq3$; $1\leq z\leq8$), or the like; lithium metal; lithium alloy; silicon-based alloy; tin-based alloy; metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, or the like; a conductive polymer, such as polyacetylene; a Li—Co—Ni type material; or a mixture of two or more of them.

The titanium oxide has an anatase phase or rutile phase and may be represented by the following Chemical Formula 1, and non-limiting examples thereof include $TiO_2$.

$$Ti_{1-x}M_xO_{2-y}Z_y \quad \text{[Chemical Formula 1]}$$

wherein $0 \leq x < 0.2$, $0 \leq y \leq 0.5$,

M is at least one element selected from the group consisting of Cu, Mn, Mg, Ni, Sn, Sr, Zn, Al, Si, Zr, Sb and Mo, and Z is at least one anion selected from the group consisting of F, Cl, Br and I.

The carbonaceous material may be at least one selected from the group consisting of crystalline artificial graphite, crystalline natural graphite, amorphous hard carbon, low-crystalline soft carbon, carbon black, acetylene black, Ketjen black, Super P, graphene and fibrous carbon, and preferably may be crystalline artificial graphite and/or crystalline natural graphite.

The negative electrode active material preferably has a reaction potential of 0.005-1.5V, 0.1-1.5V, 0.1-1.0V, or 1.0-1.5V, based on $Li/Li^+$, with a view to energy density. Herein, 'reaction potential' refers to an electric potential where electrochemical oxidation or reduction occurs, and means a value measured by a potentiometer on the basis of the lithium reaction potential ($Li/Li^+$), as mentioned above.

According to an embodiment of the present disclosure, when the electrode is a positive electrode, the positive electrode active material may include a lithium transition metal oxide represented by the following Chemical Formula 2 or Chemical Formula 3.

$$Li_xM_yMn_{2-y}O_{4-z}A_z \quad \text{[Chemical Formula 2]}$$

wherein M is Al, Mg, Ni, Co, Fe, Cr, V, Ti, Cu, B, Ca, Zn, Zr, Nb, Mo, Sr, Sb, W, Ti, Bi or a mixture of two or more of them;

A is at least one monovalent or divalent anion;

$0.9 \leq x \leq 1.2$; $0 < y < 2$; and $0 \leq z < 0.2$.

$$(1-x)LiM'O_{2-y}A_y\text{-}xLi_2MnO_{3-y'}A_{y'} \quad \text{[Chemical Formula 3]}$$

wherein M' is $Mn_aM_b$;

M is Ni, Ti, Co, Al, Cu, Fe, Mg, B, Cr, Zr, Zn, or a mixture of two or more of them;

A is at least one selected from the anions consisting of $PO_4$, $BO_3$, $CO_3$, F and $NO_3$;

$0 < x < 1$; $0 < y \leq 0.02$; $0 < y' \leq 0.02$; $0.5 \leq a \leq 1.0$; $0 \leq b \leq 0.5$; and $a+b=1$.

In addition to the lithium transition metal oxides represented by the above Chemical Formulae, particular examples of the positive electrode active material may include, but are not limited to: layered compounds, such as lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $LiMn_{2-x}M_xO_2$ (wherein M=Co, Ni, Fe, Cr, Zn or Ta, and x=0.01-0.1) or $Li_2Mn_3MO_8$ (wherein M=Fe, Co, Ni, Cu or Zn); lithium manganese composite oxides having a spinel structure, represented by $LiNi_xMn_{2-x}O_4$; $LiMn_2O_4$ in which Li is partially substituted with an alkaline earth metal ion; disulfide compounds; $Fe_2(MoO_4)_3$; or the like.

According to an embodiment of the present disclosure, each electrode is obtained by applying an electrode mixture composition including an electrode active material, conductive material and a binder to an electrode current collector, and carrying out pressing and drying. If necessary, the mixture may further include a filler.

According to an embodiment of the present disclosure, the conductive material is added generally in an amount of 1-50 wt % based on the total weight of the mixture including the positive electrode active material. Such a conductive material is not particularly limited, as long as it has conductivity, while not causing any chemical change in the corresponding battery. Particular examples of the conductive material include: graphite, such as natural graphite or artificial graphite; carbon black, such as carbon black, acetylene black, Ketjen black, channel black, furnace black, lamp black or thermal black; conductive fibers, such as carbon fibers or metallic fibers; metal powder, such as fluorocarbon, aluminum or nickel powder; conductive whiskers, such as zinc oxide or potassium titanate; conductive metal oxide, such as titanium oxide; conductive materials, such as a polyphenylene derivative; or the like.

According to an embodiment of the present disclosure, the binder is an ingredient which assists binding of the active material with the conductive material and binding to the current collector, and is added generally in an amount of 1-50 wt %, based on the total weight of the mixture including the electrode active material. Particular examples of the binder include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluororubber, various copolymers, or the like.

According to an embodiment of the present disclosure, the filler is an ingredient which inhibits swelling of an electrode and is used optionally. Such a filler is not particularly limited, as long as it is a fibrous material, while not causing any chemical change in the corresponding battery. Particular examples of the filler include: olefinic polymers, such as polyethylene or polypropylene; and fibrous materials, such as glass fibers or carbon fibers.

Then, the electrode is allowed to pass through Reaction System 2 by a conveying roll to carry out pre-lithiation (step (S3)).

According to an embodiment of the present disclosure, Reaction System 2 includes the electrolyte for pre-lithiation, charged by the reduction at the carbon felt, and the charged electrolyte for pre-lithiation supplies electrons to the electrode to be pre-lithiated.

According to an embodiment of the present disclosure, the electrons generated by applying electric current to lithium metal and the electrolyte for pre-lithiation in Reaction System 1 are introduced into the pores formed in the carbon felt, and then reduce the electrolyte for pre-lithiation. In other words, the electrolyte for pre-lithiation is charged, and then the charged electrolyte for pre-lithiation is introduced to Reaction System 2. The electric current supplied to the carbon felt may have a current density of 0.001-1000 $mA/cm^2$, 0.1-100 $mA/cm^2$, 1-50 $mA/cm^2$, or 10-50 $mA/cm^2$. When the current density is within the above-defined range, the composition for pre-lithiation may be charged adequately.

According to an embodiment of the present disclosure, the carbon felt may accept electric current for 10-180 minutes, 30-180 minutes, or 30-60 minutes. When the carbon felt accepts electric current for the above-defined time range, the electrolyte for pre-lithiation, more particularly the organic material or inorganic material contained in the electrolyte, is reduced so that the electrolyte for pre-lithiation may be charged.

According to an embodiment of the present disclosure, when the carbon felt accepts a low current density for a long time, low polarization (resistance) is applied to the electrode by virtue of a low electric current value. In this case, it is less likely that side reactions occur, but such a long time functions as a factor of increasing the product cost. On the contrary, when the carbon felt accepts a high current density for a short time, high polarization is applied to the electrode to increase a possibility of exposure to side reactions (electrolyte decomposition). In addition, when the organic material or inorganic material contained in the electrolyte for pre-lithiation has low reactivity, it cannot react sufficiently at such a low current density, and thus it is not possible to obtain a charged electrolyte for pre-lithiation.

According to an embodiment of the present disclosure, the electrode to be pre-lithiated may be in contact with the electrolyte for pre-lithiation for 10-180 minutes, 30-180 minutes, or 30-60 minutes. When the electrode to be pre-lithiated is in contact with the electrolyte for pre-lithiation for the above-defined time range, it is possible to carry out spontaneous pre-lithiation of the electrode by a difference in thermodynamic energy (difference in electric potential).

In another aspect of the present disclosure, there is provided an apparatus for pre-lithiation which includes Reaction System 1 including lithium metal, a separator stacked on the lithium metal, an electrolyte for pre-lithiation and carbon felt, and Reaction System 2 including the electrolyte for pre-lithiation and an electrode to be pre-lithiated, wherein Reaction System 1 and Reaction System 2 communicate with each other.

Figure 3:
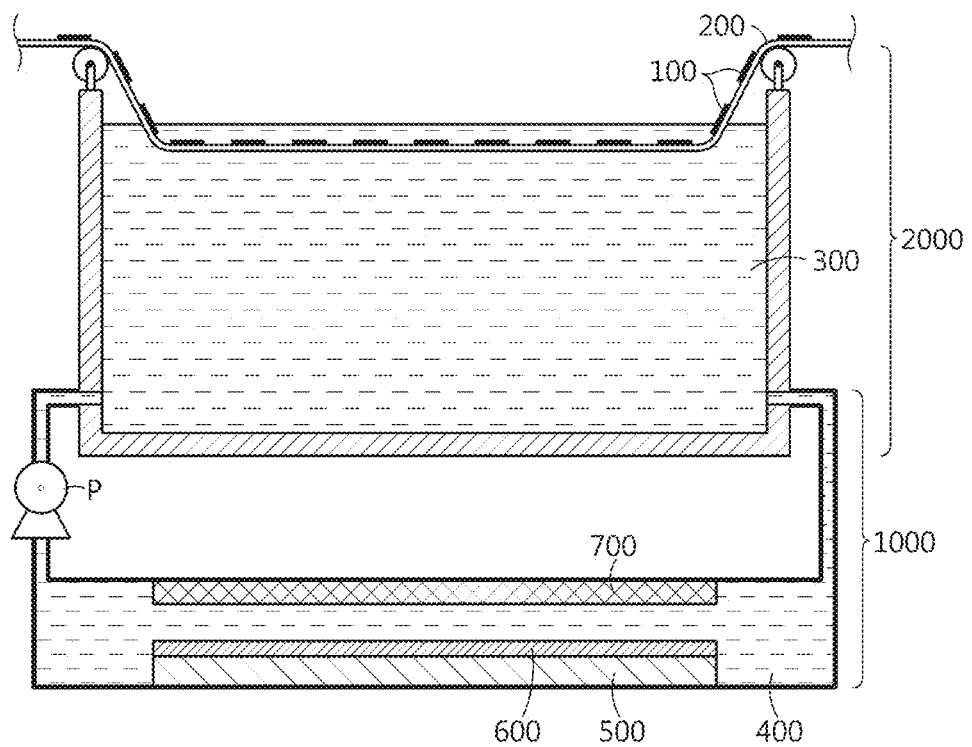
FIG. 3 is a schematic view illustrating the constitution of a recyclable electrolyte batch applied to a manufacture processing line according to an embodiment of the present disclosure.

Referring to FIG. 3 illustrating the apparatus for pre-lithiation according to an embodiment of the present disclosure, the apparatus for pre-lithiation includes Reaction System 1 1000 including lithium metal 500, a separator 600 stacked on the lithium metal 500, an electrolyte 400 for pre-lithiation and carbon felt 700, and Reaction System 2 2000 including the electrolyte 300 for pre-lithiation and an electrode 100 to be pre-lithiated, wherein Reaction System 1 and Reaction System 2 communicate with each other through a line configured to convey the electrolyte for pre-lithiation, the carbon felt 700 is linked to an electricity supplying source. The electrode 100 to be pre-lithiated is conveyed by a conveying roll 200, and is allowed to pass through Reaction System 2 2000 in such a manner that it is introduced to Reaction System 2 from the left side of the drawing, dipped in the electrolyte 300 for pre-lithiation, and is discharged from Reaction System 2 toward the right side of the drawing. The electrolyte 400 for pre-lithiation of Reaction System 1 1000 is conveyed to Reaction System 2 2000 through a line by means of potential energy or artificial treatment (pump), and is present in a charged state in Reaction System 2 2000 and thus supplies electrons to the electrode to be pre-lithiated. The charged electrolyte 300 for pre-lithiation contained in Reaction System 2 2000 is conveyed to Reaction System 1 1000 by means of a pump P, or the like.

Figure 4:
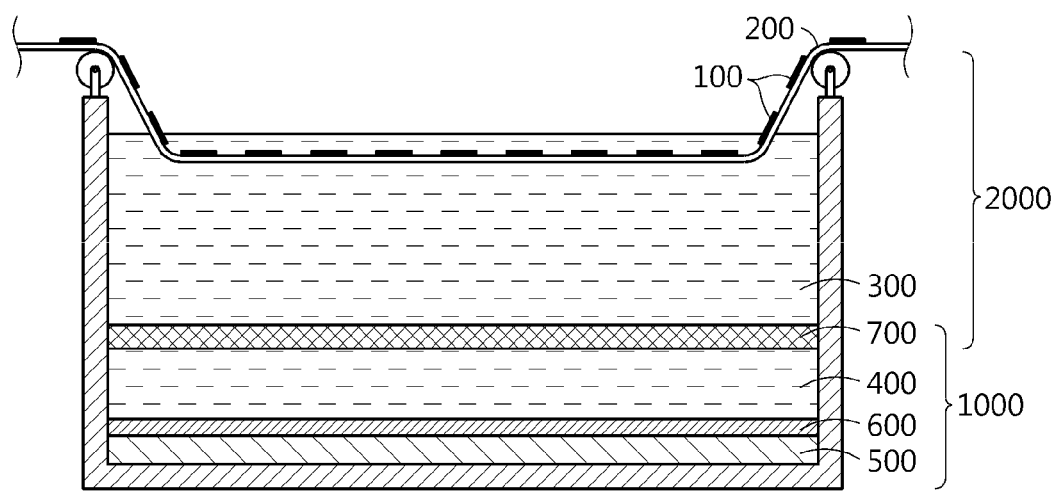
FIG. 4 is a schematic view illustrating the constitution of a non-recyclable electrolyte batch applied to a manufacture processing line according to an embodiment of the present disclosure.

Referring to FIG. 4 illustrating the apparatus for pre-lithiation according to an embodiment of the present disclosure, the apparatus for pre-lithiation includes Reaction System 1 1000 including lithium metal, a separator, an electrolyte for pre-lithiation and carbon felt, and Reaction System 2 2000 including the electrolyte for pre-lithiation and an electrode to be pre-lithiated, wherein Reaction System 1 and Reaction System 2 are received in one reaction vessel. In this embodiment, Reaction System 1 and Reaction System 2 are differentiated from each other for convenience as a portion, where the electrolyte 400 for pre-lithiation, which is to be charged by accepting electrons from lithium metal as a counter electrode, is positioned predominantly, and as a portion, where the electrolyte 300 for pre-lithiation, which donates electrons to the electrode to be pre-lithiated, is positioned predominantly. In FIG. 4, Reaction System 1 and Reaction System 2 are differentiated from each other by the porous carbon felt 700, but the electrolyte 300 for pre-lithiation and the electrolyte 400 for pre-lithiation, or Reaction System 1 1000 and Reaction System 2 2000 communicate fluidically with each other. Reaction System 1 1000 in FIG. 4 includes lithium metal 500, a separator 600 stacked on the lithium metal 500, an electrolyte 400 for pre-lithiation and carbon felt 700, while Reaction System 2 2000 includes an electrode 100 to be pre-lithiated and an electrolyte 300 for pre-lithiation. The electrode 100 to be pre-lithiated is conveyed by a conveying roll 200, and then is introduced to Reaction System 2 from the left side of the drawing, dipped in the electrolyte 300 for pre-lithiation and is discharged from Reaction System 2 toward the right side of the drawing. The carbon felt 700 is linked to an electricity supplying source, and the electrolyte 400 for pre-lithiation of Reaction System 1 is reduced in the pores of the carbon felt, conveyed to Reaction System 2 2000 and is present in a charged state in Reaction System 2 2000, and thus supplies electrons to the electrode to be pre-lithiated. The charged electrolyte 300 for pre-lithiation contained in Reaction System 2 2000 is oxidized again and conveyed to Reaction System 1 1000 through the pores of the carbon felt.

In still another aspect of the present disclosure, there is provided a pre-lithiated electrode, particularly a pre-lithiated negative electrode, obtained by the method for pre-lithiation of an electrode.

In still another aspect of the present disclosure, there is provided a secondary battery which includes an electrode assembly including the pre-lithiated negative electrode, a positive electrode and a separator interposed between the pre-lithiated negative electrode and the positive electrode, and an electrolyte injected thereto. The secondary battery may be a lithium ion battery, lithium ion polymer battery, or a lithium polymer battery.

In general, the lithium secondary battery includes a positive electrode, a negative electrode, a separator interposed between the positive electrode and the negative electrode, and a lithium salt-containing non-aqueous electrolyte. Reference will be made to the above description about the positive electrode, negative electrode and the separator. Hereinafter, the other ingredients of the lithium secondary battery will be explained.

The lithium salt-containing non-aqueous electrolyte includes a non-aqueous electrolyte and lithium salt, and the non-aqueous electrolyte that may be used include a non-aqueous organic solvent, organic solid electrolyte, inorganic solid electrolyte, or the like, but is not limited thereto.

Particular examples of the non-aqueous organic solvent include aprotic organic solvents, such as N-methyl-2-pyrrolidinone, propylene carbonate, ethylene carbonate, butylene carbonate, dimethyl carbonate, diethyl carbonate, gamma-butyrolactone, 1,2-dimethoxyethane, tetrahydroxy franc, 2-methyl tetrahydrofuran, dimethyl sulfoxide, 1,3-dioxolane, formamide, dimethyl formamide, dioxolane, acetonitrile, nitromethane, methyl formate, methyl acetate, triphosphate, trimethoxy methane, dioxolane derivatives, sulfolane, methyl sulfolane, 1,3-dimethyl-2-imidazolidinone, propylene carbonate derivatives, tetrahydrofuran derivatives, ethers, methyl propionate, ethyl propionate, or the like.

Particular examples of the organic solid electrolyte include polyethylene derivatives, polyethylene oxide derivatives, polypropylene derivatives, phosphate polymers, polyagiation lysine, polyester sulfide, polyvinyl alcohol, polyvinylidene fluoride, polymers containing an ionically dissociable group, or the like.

Particular examples of the inorganic solid electrolyte include Li nitrides, halides, sulfates, or the like, such as $Li_3N$, $LiI$, $Li_5NI_2$, $Li_3N-LiI-LiOH$, $LiSiO_4$, $LiSiO_4-LiI-LiOH$, $Li_2SiS_3$, $Li_4SiO_4$, $Li_4SiO_4-LiI-LiOH$, $Li_3PO_4-Li_2S-SiS_2$, etc.

The lithium salt is a substance that can be dissolved easily in the non-aqueous electrolyte. Particular examples of the lithium salt include $LiCl$, $LiBr$, $LiI$, $LiClO_4$, $LiBF_4$, $LiB_{10}Cl_{10}$, $LiPF_6$, $LiFSI$, $LiTFSI$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, lithium chloroborate, lower aliphatic lithium carboxylates, lithium 4-phenylborate, imide, or the like.

In addition, the lithium salt-containing non-aqueous electrolyte may further include additives, such as pyridine, triethyl phosphite, triethanolamine, cyclic ethers, ethylene diamine, n-glyme, triamide hexaphosphate, nitrobenzene derivatives, sulfur, quinone imine dyes, N-substituted oxazolidinone, N,N-substituted imidazolidine, ethylene glycol dialkyl ether, ammonium salt, pyrrole, 2-methoxyethanol and aluminum trichloride, in order to improve the charge/discharge characteristics, flame resistance, or the like. Optionally, the lithium salt-containing non-aqueous electrolyte may further include a halogen-containing solvent, such as carbon tetrachloride or trifluoroethylene, in order to impart non-combustibility. The lithium salt-containing non-aqueous electrolyte may further include carbon dioxide gas in order to improve the high-temperature storage characteristics. In addition, the lithium salt-containing non-aqueous electrolyte may further include fluoro-ethylene carbonate (FEC), propene sultone (PRS), or the like.

In yet another aspect of the present disclosure, there are provided a battery module including the secondary battery as a unit cell, a battery pack including the battery module, and a device including the battery pack as a power source.

Particular examples of the device include an electric vehicle, hybrid electric vehicle, plug-in hybrid electric vehicle, power storage system, or the like, but are not limited thereto.

Hereinafter, particular embodiments of the present disclosure will be explained with reference to the accompanying drawings. However, the following embodiments are for illustrative purposes only and the scope of the present disclosure is not limited thereto.

Example 1

<Preparation of Electrolyte for Pre-Lithiation>

First, prepared was 100 mL of an electrolyte including 1M $LiPF_6$ dissolved in ethylene carbonate (EC)/ethyl methyl carbonate (EMC)=3/7 (volume ratio). Next, N-butyl phthalimide (reaction potential: 1.52V (vs. $Li/Li^+$)) was introduced to the electrolyte as an organic material capable of oxidation/reduction in the electrolyte to a concentration of 0.1M, and the resultant mixture was stirred for 24 hours to provide an electrolyte for pre-lithiation.

<Manufacture of Negative Electrode>

First, 80 wt % of a negative electrode active material (anatase-$TiO_2$ (reaction potential: 1.6-1.8V or higher (vs. $Li/Li^+$)), 10 wt % of denka black (conductive material) and 10 wt % of polyvinylidene fluoride (PVDF) were added to N-methyl pyrrolidone to prepare a negative electrode mixture composition. A copper current collector was used as an electrode current collector and the negative electrode mixture composition was coated on the copper current collector. Then, vacuum drying was carried out at 120° C., followed by pressing, to form a negative electrode active material layer. In this manner, a negative electrode was obtained.

<Preparation of Pre-Lithiation Reaction System and Pre-Lithiation Process>

As shown in FIG. 3, Reaction System 1 including lithium metal foil, a separator, the electrolyte for pre-lithiation prepared as described above, and porous carbon felt having a thickness of 6.1 mm (10×10 $cm^2$, available from AvCarb Material Solutions, Trade name: AvCarb G600A Graphite Battery Felt) was installed, and Reaction System 2 including the above-described electrolyte for pre-lithiation and negative electrode to be pre-lithiated was provided.

Reaction System 2 is a batch having a width of 25 cm, and the negative electrode (5×5 $cm^2$) was allowed to pass therethrough by a conveying roll. The conveying roll passed through the batch at a rate of 25 cm/s. Herein, an electric current of 20.2 mA was applied to the porous carbon felt for 60 minutes in order to reduce the electrolyte for pre-lithiation electrochemically. The porous carbon felt provides a site where the electrolyte for pre-lithiation of Reaction System 1 is reduced, and the reduced electrolyte for pre-lithiation causes electron migration by a difference in electric potential from the electrode to be pre-lithiated. As a result, the negative electrode is in contact with the electrolyte for pre-lithiation for 60 minutes during which the negative electrode passes through the batch, and thus is pre-lithiated (charged) to 9% of the negative electrode charge capacity.

<Manufacture of Lithium Secondary Battery>

A separator was interposed between the above-described negative electrode and $LiCoO_2$ as a counter electrode to obtain a coin-type battery. In addition, an electrolyte including 1M $LiPF_6$ dissolved in ethylene carbonate (EC)/ethyl methyl carbonate (EMC)=3/7 (volume ratio) was injected to the battery.

<Cycle Charge/Discharge Test>

The obtained coin-type battery was determined for its cycle characteristics by using an electrochemical charger. The battery was charged to 4.2V (vs. $Li/Li^+$) and discharged to 2.5V (vs. $Li/Li^+$) at a current density of 0.1 C up to the third cycle. From the fourth cycle, charge/discharge was carried out at a current density of 0.5 C under the same voltage condition.

Example 2

A negative electrode was pre-lithiated in the same manner as Example 1, except that the current density supplied to the carbon felt was changed to 40.4 mA and was applied for 30 minutes, and the negative electrode was allowed to pass through the batch at a rate of 50 cm/s. In addition, a lithium secondary battery was obtained in the same manner as Example 1.

Comparative Example 1

An electrolyte not including N-butyl phthalimide as an organic material capable of oxidation/reduction in the electrolyte but containing 1M $LiPF_6$ dissolved in ethylene carbonate (EC)/ethyl methyl carbonate (EMC)=3/7 (volume ratio) was used as an electrolyte for pre-lithiation. In addition, the same negative electrode as Example 1 was allowed to be in direct contact with lithium metal foil as a counter electrode in the electrolyte, and an electric current value of 20.2 mA was applied to the negative electrode for 1 hour to carry out pre-lithiation (electrochemical pre-lithiation through direct charging).

Comparative Example 2

A negative electrode was pre-lithiated in the same manner as Comparative Example 1 by allowing it to be in direct contact with lithium metal foil, except that an electric current value of 40.4 mA was applied to the negative electrode for 30 minutes in the pre-lithiation step of Comparative Example 1. In addition, the pre-lithiated negative electrode was used to obtain a lithium secondary battery in the same manner as Example 1.

Comparative Example 3

A negative electrode was pre-lithiated in the same manner as Example 1, except that an electrolyte not including N-butyl phthalimide as an organic material capable of oxidation/reduction in the electrolyte but containing 1M $LiPF_6$ dissolved in ethylene carbonate (EC)/ethyl methyl carbonate (EMC)=3/7 (volume ratio) was used as an electrolyte for pre-lithiation. In addition, the pre-lithiated negative electrode was used to obtain a lithium secondary battery in the same manner as Example 1.

Comparative Example 4

An electrolyte including N-butyl phthalimide as an organic material capable of oxidation/reduction at a concentration of 0.1M and containing 1M $LiPF_6$ dissolved in ethylene carbonate (EC)/ethyl methyl carbonate (EMC)=3/7 (volume ratio) was used as an electrolyte for pre-lithiation. In addition, the same negative electrode as Example 1 was allowed to be in direct contact with lithium metal foil as a counter electrode in the electrolyte, and an electric current value of 20.2 mA was applied to the negative electrode for 1 hour to carry out pre-lithiation (electrochemical pre-lithiation through direct charging).

TABLE 1

|   | Pre-lithiation method (use of charging process according to the present disclosure) | Use of organic material/inorganic material capable of oxidation/reduction in electrolyte | Charging current and time | Initial coulombic efficiency (%) | Change in thickness at $100^{th}$ cycle |
|---|---|---|---|---|---|
| Ex. 1 | ○ (Indirect charging process according to the present disclosure) | ○ (used, electrolyte including 0.1M N-butyl phthalimide) | 20.2 mA, 1 hr | 102 | 110 |
| Ex. 2 | ○ (Indirect charging process according to the present disclosure) | ○ (used, electrolyte including 0.1M N-butyl phthalimide) | 40.4 mA, 30 min. | 101 | 113 |
| Comp. Ex. 1 | X (Direct charging process using lithium counter electrode) | ○ | 20.2 mA, 1 hr | 99 | 132 |
| Comp. Ex. 2 | X (Direct charging process using lithium counter electrode) | ○ | 40.4 mA, 30 min. | 97 | 138 |
| Comp. Ex. 3 | ○ (Indirect charging process according to the present disclosure) | X | 20.2 mA, 1 hr | 92 | 151 |
| Comp. Ex. 4 | X (Direct charging process using lithium counter electrode) | ○ (used, electrolyte including 0.1M N-butyl phthalimide) | 20.2 mA, 1 hr | 97 | 136 |

In the case of Examples 1 and 2, each battery shows a higher initial coulombic efficiency and a smaller change in thickness at the 100th cycle, as compared to Comparative Examples 1 and 2. It is thought that this is because the indirect pre-lithiation process through a charged electrolyte provides a homogeneously doped (pre-lithiated) electrode. When such homogeneous pre-lithiation is carried out, it is possible to prevent lithium plating caused by partial overcharging, and thus to reduce an increase in thickness caused by lithium plating and gas generation. In addition, since there is no portion where SEI formation is insufficient in the whole electrode, it is possible to provide high coulombic efficiency at the first cycle.

In the case of Comparative Example 3, when electric current is applied by using lithium metal as a counter electrode in the electrolyte free from an organic material/inorganic material capable of oxidation/reduction in the electrolyte, no organic material/inorganic material capable of accepting electrons is present, and thus the electrolyte cannot be charged. Even when such a non-charged electrolyte is in contact with an electrode to be pre-lithiated, there is no difference in electric potential, and thus pre-lithiation may not occur. As a result, it is not possible to improve the cell performance.

In the case of Comparative Example 4, direct charging is carried out by using lithium metal as a counter electrode in the electrolyte including an organic material/inorganic material capable of oxidation/reduction in the electrolyte. When carrying out direct charging according to the related art (Comparative Example 1), low resistance is applied to the electrode to reduce side reactions, since an electrolyte free from such an organic material/inorganic material is used. However, in the case of Comparative Example 4, it is shown that higher resistance is applied to the electrode and side reactions are increased, and thus the battery shows lower performance as compared to Comparative Example 1.

The present disclosure has been described in detail. However, it should be understood that various changes and modifications within the scope of the disclosure will become apparent to those skilled in the art from this detailed description.

What is claimed is:

1. A method for pre-lithiation of an electrode, comprising the steps of:
   (S1) providing a pre-lithiation reaction system which comprises
   a first reaction system comprising lithium metal, a separator, an electrolyte for pre-lithiation and carbon felt, and
   a second reaction system comprising the electrolyte for pre-lithiation and an electrode to be pre-lithiated,
   wherein the lithium metal and the electrode to be pre-lithiated are not in direct contact with each other, and the first reaction system and the second reaction system communicate with each other;
   (S2) preparing the electrode comprising an electrode current collector, and an electrode active material layer formed on at least one surface of the electrode current collector; and
   (S3) allowing the electrode to pass through the second reaction system by a conveying roll to carry out pre-lithiation of the electrode,
   wherein the electrolyte for pre-lithiation comprises at least one of an organic material or an inorganic material capable of oxidation/reduction in the electrolyte.

2. The method for pre-lithiation of the electrode according to claim 1, wherein the electrolyte for pre-lithiation comprises an organic material, inorganic material or a mixture thereof having a reaction potential of 0.001V to 3V based on $Li/Li^+$.

3. The method for pre-lithiation of the electrode according to claim 1, wherein the electrolyte for pre-lithiation comprises at least one of a phthalimide compound as the organic material or a metallocene compound as the inorganic compound capable of oxidation/reduction in the electrolyte.

4. The method for pre-lithiation of the electrode according to claim 1, wherein the electrolyte for pre-lithiation comprises at least one of N-butyl phthalimide, N-methyl phthalimide, cobaltocene, bis (pentamethylcyclopentadienyl) cobalt as the organic material or inorganic material capable of oxidation/reduction in the electrolyte.

5. The method for pre-lithiation of the electrode according to claim 1, wherein the electrolyte for pre-lithiation comprises at least one of the organic material or inorganic material capable of oxidation/reduction in the electrolyte at a concentration of 0.0001M to 10M.

6. The method for pre-lithiation of the electrode according to claim 1, wherein an electric current ranging from 0.001 $mA/cm^2$ to 1000 $mA/cm^2$ is supplied to the carbon felt.

7. The method for pre-lithiation of the electrode according to claim 1, wherein the electrode is in contact with the electrolyte for pre-lithiation of the second reaction system for 10 minutes to 180 minutes.

8. The method for pre-lithiation of the electrode according to claim 1, wherein the electrode is a negative electrode.

9. An apparatus for pre-lithiation, comprising:
   a first reaction system comprising lithium metal, a separator stacked on the lithium metal, an electrolyte for pre-lithiation and carbon felt, and
   a second reaction system comprising the electrolyte for pre-lithiation and an electrode to be pre-lithiated,
   wherein the electrolyte for pre-lithiation comprises at least one of an organic material or inorganic material capable of oxidation/reduction in the electrolyte,
   wherein the first reaction system and second reaction system communicate with each other through a line configured to convey the electrolyte for pre-lithiation,
   the carbon felt is linked to an electricity supplying source, and
   the electrode to be pre-lithiated passes through the second reaction system by a conveying roll.

10. An apparatus for pre-lithiation, comprising:
    a first reaction system comprising lithium metal, a separator stacked on the lithium metal, an electrolyte for pre-lithiation and carbon felt, and
    a second reaction system comprising the electrolyte for pre-lithiation and an electrode to be pre-lithiated,
    wherein the electrolyte for pre-lithiation comprises at least one of an organic material or inorganic material capable of oxidation/reduction in the electrolyte,
    wherein the first reaction system and second reaction system are received in the same reaction vessel,
    the carbon felt is disposed between the first reaction system and second reaction system,
    the carbon felt is linked to an electricity supplying source, and
    the electrode to be pre-lithiated passes through the second reaction system by a conveying roll.

* * * * *